Figure 1:
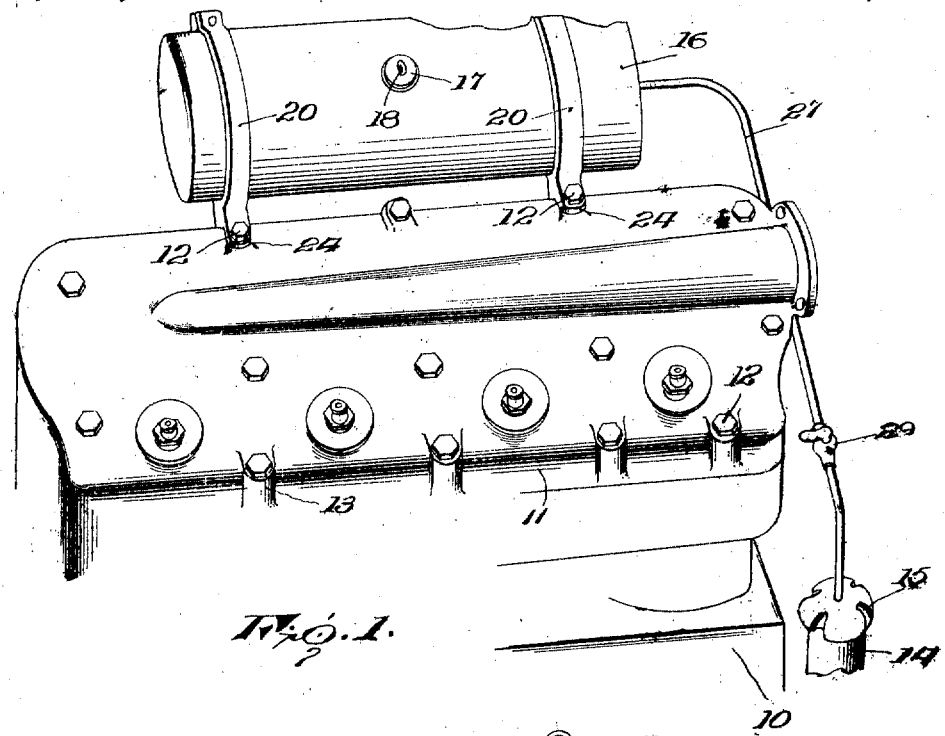

J. KNELL.
AUXILIARY OIL RESERVOIR.
APPLICATION FILED MAR. 1, 1917.

1,251,971.   Patented Jan. 1, 1918.

Inventor
J. Knell.

UNITED STATES PATENT OFFICE.

JOHN KNELL, OF NORTH ROBINSON, OHIO.

AUXILIARY OIL-RESERVOIR.

1,251,971.     Specification of Letters Patent.     Patented Jan. 1, 1918.

Application filed March 1, 1917. Serial No. 151,824.

*To all whom it may concern:*

Be it known that I, JOHN KNELL, a citizen of the United States, residing at North Robinson, in the county of Crawford and State of Ohio, have invented certain new and useful Improvements in Auxiliary Oil-Reservoirs, of which the following is a specification.

This invention relates to an improved auxiliary reservoir for motor vehicle engines and has as its primary object to provide a construction wherein a supply of oil for the engine may be carried and used when the main oil supply has become exhausted, thus providing a very convenient and effective arrangement in any instance where it would be impossible to immediately replenish the main oil supply.

The invention has as a further object to provide an arrangement wherein the tank employed will be supported upon the engine of the vehicle so that the heat from the engine will, in cold weather, keep the auxiliary supply of oil warm and fluent and wherein a pipe will be led from the tank to the oil intake tube of the engine with a valve interposed in said pipe so that the oil may be fed from the tank into the engine by simply manipulating the said valve.

And the invention has as a still further object to provide improved supporting brackets for the tank with the said brackets formed to rest against the engine and be secured by the engine cylinder head bolts, thereby eliminating the necessity for separate fastening devices for the said brackets.

Figure 2:
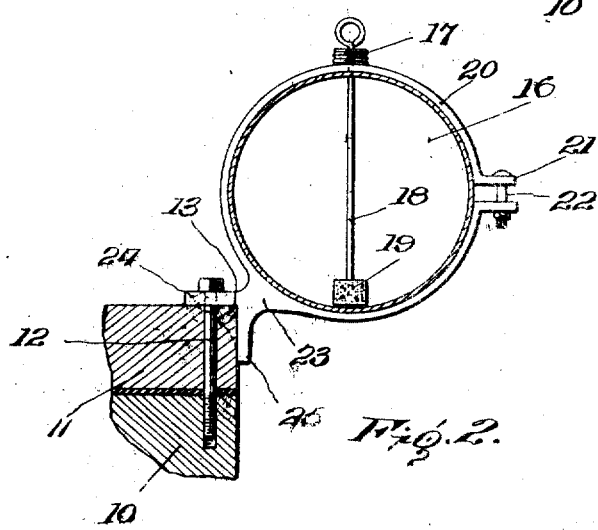

Other and incidental objects will appear as the description proceeds and in the drawings wherein I have illustrated the preferred embodiment of the invention and wherein similar reference characters designate corresponding parts through the several views:

Figure 1 is a fragmentary perspective view showing my improved tank mounted upon a conventional type of motor vehicle engine, and Fig. 2 is a transverse sectional view illustrating the manner in which the brackets for the tank are connected to the engine by the cylinder head bolts of the engine.

As previously intimated, the present invention is designed to provide an auxiliary oil reservoir for internal combustion engines and in order that the construction mounting and operation of the invention may be accurately understood, I have shown the device in connection with a conventional type of engine 10 having a removable cylinder head block 11 connected to the engine body by a plurality of bolts 12, the block 11 being formed with squared portions 13 to provide seats for the said bolts. Leading into the base of the engine is a breather tube 14 which also provides a filler tube for supplying oil to the crank case of the engine, and fitting over the outer end of the said tube is a cap 15 which may be displaced for pouring oil into the engine base.

Coming now more particularly to the subject of the present invention, I employ a preferably cylindrical tank 16. This tank may be formed of any approved material and is provided upon the upper side thereof with a suitable filling opening closed by a screw cap 17. Slidable through the said cap is a float rod 18 upon the lower end of which is mounted a float 19. Supporting the tank in position upon the engine 10, are coacting brackets 20. These brackets are each formed with a split annular body arranged to embrace the tank 16 and formed on the terminals of the body are confronting laterally directed lugs 21 adjustably connected by a bolt or other suitable fastening device 22 for clamping the bracket body about the tank. Extending from the bracket body, is a laterally directed supporting arm 23 provided with angularly disposed lugs 24 and 25 respectively.

As particularly shown in Fig. 1 of the drawings, the brackets 20 are mounted upon the engine at the side thereof opposite the exhaust pipe of the engine with the lugs 24 and 25 of the said brackets engaging around adjacent bolt seats 13 of the cylinder head block 11. Extending loosely through the lugs 24 are, as particularly shown in Fig. 2, the bolts 12 associated with the said seats. The brackets are thus firmly connected with the engine with the arms 23 of the said brackets extending laterally from the engine to support the tank slightly spaced above and at one side of the engine. This provides a very effective arrangement since the tank 16 will thus be disposed within the engine hood at one side of the engine out of the way while, at the same time the heat from the engine will, in cold weather, radiate to the tank to maintain the oil therein warm and fluent. Also, attention is directed to the fact that by forming the arms 23 of the brackets with the lugs 24 and 25, the said bracket may be connected to the engine by a pair of the bolts securing the cylinder head block 11, so that the necessity for the use of separate fastening devices for the said brackets is accordingly eliminated.

Extending from the forward end of the tank 16 is a discharge pipe 27 which extends laterally and downwardly in front of the engine 10, as particularly shown in Fig. 1, and, at its lower extremity, is loosely fitted through the cap 15 of the filler tube 14. Interposed in the said pipe is a cut-off valve 29.

As will now be readily understood, the tank 16 may be easily filled with a supply of oil by simply removing the cap 17. In accordance with the objects of the invention, this oil is to be carried within the said tank until a time when the main supply of oil in the crank case of the engine has become exhausted and it is impossible to immediately replenish the said main oil supply. Under such conditions, the valve 29 may then be operated to permit the oil to flow from the tank 16 through the pipe 27 into the engine base for properly lubricating the engine.

It will accordingly be seen that I provide a very simple and efficient arrangement for the purpose set forth. The supply tank 16 may be kept full of oil practically at all times to furnish an oil supply auxiliary to the main supply of oil in the crank case of the engine so that the engine may always be maintained properly lubricated. Under ordinary conditions, the main supply of oil for the engine will be introduced through the tube 14 and in this connection, it is to be observed that the cap 15 may be moved upwardly upon the lower extremity of the pipe 27 to permit of this operation.

Having thus described the invention, what is claimed as new, is:

The combination with an internal combustion engine having a cylinder head block provided with squared bolt seats, and bolts extending through the said seats and connecting the block with the engine body, of spaced supporting brackets mounted upon the engine and each including an integral annular body split at the outer side thereof, an integral arm formed on the body to project laterally therefrom, and angularly disposed lugs formed on the outer terminal of said arm, the lugs of said brackets fitting around the squared bolt seats of the engine cylinder head block with the uppermost of said lugs engaged by the said bolts for connecting the brackets with the engine to project laterally therefrom, means for adjustably contracting the said bracket bodies, and means mounted upon the brackets and adapted to provide an auxiliary oil reservoir for the engine, the said last mentioned means being supported by the brackets at one side of the engine.

In testimony whereof I affix my signature.

JOHN KNELL. [L. S.]